UNITED STATES PATENT OFFICE.

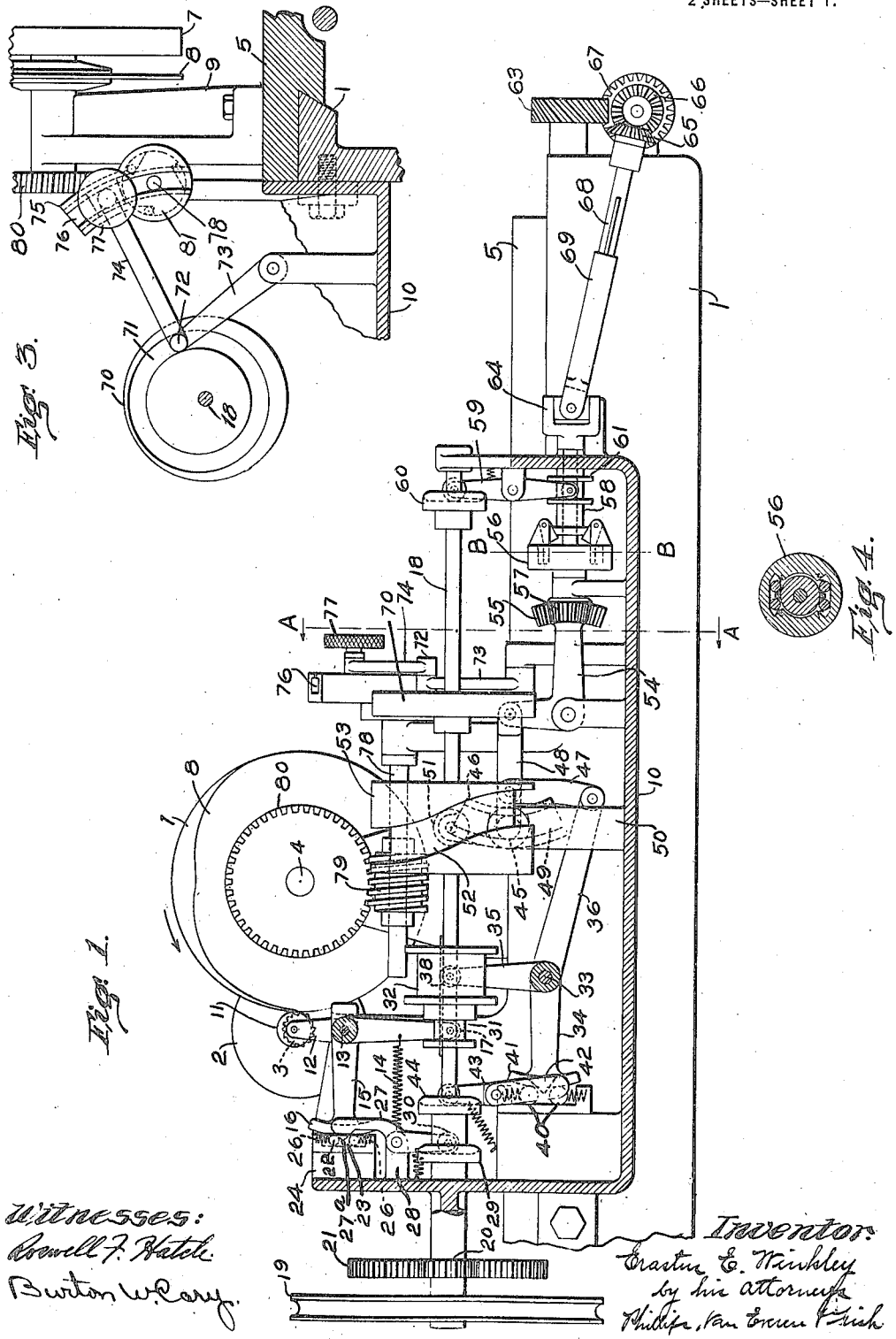

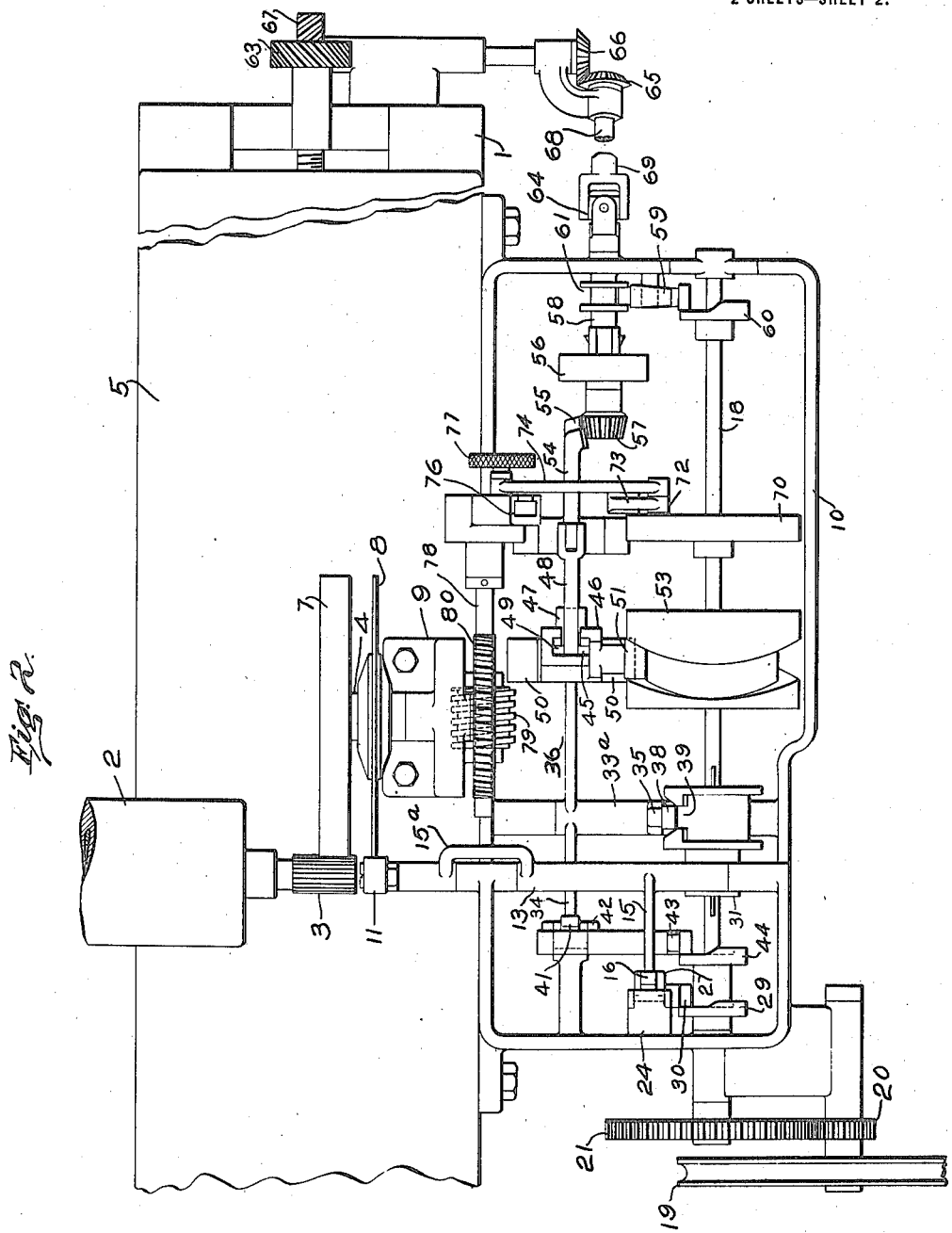

ERASTUS E. WINKLEY, OF LYNN, MASSACHUSETTS.

CAM-CUTTING MACHINE.

1,197,088.  Specification of Letters Patent.  Patented Sept. 5, 1916.

Application filed May 13, 1910. Serial No. 561,051.

*To all whom it may concern:*

Be it known that I, ERASTUS E. WINKLEY, a citizen of the United States, residing at Lynn, in the county of Essex and State of Massachusetts, have invented certain new and useful Improvements in Cam-Cutting Machines; and I do hereby declare the following to be a full, clear, and exact description of the invention, such as will enable others skilled in the art to which it appertains to make and use the same.

This invention relates to certain new and useful improvements in cam cutting machines.

The cam cutting machines at present in use comprise mechanism for actuating either the cam cutting tool or the cam blank which consists of a pointer the movements of which are controlled by a pattern cam having the same contour to which it is desired to shape the cam blank. In all of these machines the pattern cam furnishes the power necessary to actuate either the tool or work through the pointer and a train of intermediate mechanism. A considerable force has to be exerted upon the pointer in order to obtain this movement and the pattern cams are accordingly constructed in a substantial manner, generally being cast of some suitable metal and machined to the proper shape and size which necessitates a considerable amount of labor and time.

The object of the present invention is to provide a cam cutting machine which will cut cams of any desired shape or size, the cutting of the cam blank being controlled by a pattern cam which may be quickly and easily made.

With the above object in view the invention contemplates the provision of a controlling device for guiding or controlling the direction of movement of the cam blank which comprises a feeler arranged to engage the periphery of a relatively moving pattern cam and an actuating mechanism which is adapted to be thrown into and out of operation by a slight movement of the feeler. The actuating mechanism derives its power from an exterior source and the movement of the feeler simply controls the actuating mechanism in its operation.

In the accompanying drawings, illustrating the preferred form of the invention, Figure 1 represents an elevation of the improved device attached to the bed of a milling machine, the side of the casing being cut away to show the operating mechanism; Fig. 2 is a plan view of the structure shown in Fig. 1; Fig. 3 is a sectional detail on the line A—A of Fig. 1, showing the mechanism for intermittently rotating the cam blank; and Fig. 4 is a section upon the line B—B of Fig. 1, showing the time clutch for operating the feed mechanism of the milling machine table.

In the embodiment of the invention illustrated in the drawings, the automatic mechanism which is employed for controlling the movements of the cam blank is shown as attached to the fixed frame 1 of a milling machine of the ordinary type, comprising a head 2 upon the end of which is mounted a milling cutter 3 and a movable table or platen 5 which is mounted to slide longitudinally upon the upper part of the frame or bed of the cam cutting machine. The table or platen 5 supports the cam blank 7 and pattern cam 8. The cam blank and pattern cam are both mounted upon the shaft 4 which is journaled in the support 9 bolted to the upper surface of the platen.

The mechanism which is employed for actuating the platen 5, and consequently controlling the movement of the cam blank 7, is mounted in a casing 10 which is rigidly fastened to the front face of the bed of the machine. A feeler 11 is mounted adjacent to the pattern cam 8 and is constantly pressed against the periphery by a spring 14. The movement of the feeler as controlled by the pattern cam controls in turn the movement of the cam blank through an actuating mechanism which is thrown into and out of operation by the movement of the feeler. The feeler 11 is set slightly in advance of the milling cutter 3 in order that the controlling mechanism may be operated and the cam blank assume the proper position before the point on the periphery of the cam blank, which corresponds to the point on the pattern cam in contact with the feeler, is presented to the milling cutter. The actuating mechanism derives its power from an exterior source and as the movement of the feeler 11 merely controls this power a relatively slight pressure upon the feeler is sufficient to cause the actuation of the train of mechanism operating to direct the cam blank. It can thus readily be seen that it is not necessary to make a pattern cam which is capable of withstanding a considerable pressure, but that the pattern cam may be constructed of any material which is capable of being readily cut or operated upon. The only requisite is that the pattern cam shall be sufficiently stiff to maintain its true shape and withstand the very slight pressure which is caused by contact with the feeler 11. The material preferably used from which to construct the pattern is tin, as this metal is easily cut and is capable of retaining its shape during the operation of the machine. The importance of this feature is easily seen when it is considered that in a great many instances it is only desired to cut a few cams of the same kind and with this improved attachment it is possible to make the pattern and cut the cams in substantially the same time that it takes to make the pattern cam alone in the existing type of machines.

The mechanism for controlling the movement of the cam blank comprises an actuating mechanism operated by a separate driving means, the operation being controlled by the movement of the feeler. The feeler 11 comprises a roll which is journaled upon the upper end of an arm 12. The arm 12 is sleeved to one end of a shaft 13 which is mounted in the sides of the casing 10. A bell crank lever 15 is sleeved to the shaft 13 and in order that the bell crank 15 shall move in unison with the arm 12 the two sleeves are rigidly connected by a curved link 15ª. The horizontal arm of the bell crank lever 15 has a curved segment 16 mounted thereon and the vertical arm of the bell crank has a roll 17 journaled in the lower end. The means for operating the actuating mechanism consists of a cam shaft 18 extending longitudinally through the casing 10 and journaled in the ends thereof. The cam shaft is positively driven by the belt pulley 19 and the gears 20 and 21. It will now be seen that movement of the feeler 11 will oscillate the bell crank 15 operatively connected with it. The bell crank, however, is locked against oscillation, except at certain predetermined intervals, by a locking mechanism comprising a pair of rolls 22 which are mounted in a recess 23 on the block 24 and are normally wedged between the rear wall of the recess and the segment 16 by means of springs 26. Means is provided, however, for disengaging the locking mechanism at predetermined intervals, comprising a lever 27 pivoted intermediate its length upon the bracket 28 and having a wedge-shaped nose 27ª formed upon its upper end which projects into the recess 23 and forces the rolls 22 apart. The lever is operated by a plate cam 29 mounted upon the cam shaft 18 and contacting with an anti-friction roll 30 upon the lower end of the lever 27 which is yieldingly held in engagement with the cam 29. The roll 17, journaled upon the vertical arm of the bell crank 15, engages a peripheral groove 31 formed in one end of the rotary cam 32.

The cam 32 is splined to the cam shaft 18 and is arranged to be moved longitudinally by the bell crank lever 15. A shaft 33 is journaled in the casing 10 below the cam shaft 18 and is provided with a sleeve 33ª to which are fastened three projecting arms, denoted respectively by 34, 35 and 36. The arm 35 is operated from the cam 32 by an anti-friction roll 38 journaled in the upper end which engages with the cam 32. The cam 32 is of the type ordinarily known as a groove cam and at one point upon its periphery the groove narrows to a passage 39 which is just wide enough to allow the anti-friction roll 38 to pass therethrough without any lateral movement. A locking means is provided for the arm 34 similar to the one which is provided for the bell crank 15, comprising a pair of rolls 40 which bear against the curved segment 41 on the outer end of the arm 34 and are forced apart by the wedge-shaped nose 42 mounted upon the lever 43 which is adapted to be actuated by the cam 44 mounted upon the cam shaft 18. The upper end of the lever 43 carries an anti-friction roll which is yieldably held against the cam 44. The timing of the cams 29, 44 and 32 is so arranged that the bell crank 15 will be unlocked, move the cam 32 and be again locked before the roll 38 engages the passage 39. The cam 44 actuates the disengaging means for unlocking the lever 34 just prior to the entrance of the roll 38 into the passage 39 and allows the arm 34 to be again locked immediately after the exit of the roll 38 from the passage 39. The actuating mechanism comprises an anti-friction roll 45 normally maintained at a point coincident with the axis about which the curved segment 46 oscillates, shown in dotted lines in Fig. 1. The roll 45 is supported in this position by means of the link 47 connected to the arm 36 and the lever 48 pivoted to the link 47 and bearing the roll 45 upon its free end. The curved segment 46 is provided with a slot 49 in which the roll 45 runs. The segment 46 is pivotally mounted at a point midway between its ends upon the supporting bracket 50 and is oscillated by the engagement of the roll 51, journaled upon the upper end of the segment, with the groove 52 in the periphery of the cam 53. When the various parts of the mechanism are in their normal position the roll 45 will rest in the slot 49 formed in the face of the segment 46 at a point coincident with the axis about which the segment will produce no resultant movement upon the roll 45 but whenever the cam 32 is moved in either direction the arms connecting the cam with the segment will be rocked to move the roll 45 either above or below the axis of the segment according to the direction of movement of the cam 32. The movement communicated to the roll 45 will then be transmitted through the arm 48 and bell crank lever 54 to the toothed segment 55 mounted upon the end of one arm of the bell crank 54. It will be seen from the shape of the groove 52 that the curved segment 46 will be oscillated back and forth once during each revolution of the cam 53. It is only desired to utilize the movement generated by the cam during about one half a revolution. This is accomplished by providing a clutch 56, of a type commonly employed and which normally locks the gear 57 against rotation relatively to the shaft 58 but is adapted to be disengaged at certain predetermined intervals by a mechanism comprising a lever 59 pivoted intermediate its length and bearing at one end against a cam 60 mounted upon the cam shaft 18 and operatively connected at the other end to a slidable sleeve 61 which carries the disengaging means for the clutch. The shaft 58 drives the skew gear 63 through a train of mechanism comprising a universal coupling 64 mounted upon the end of the shaft 58, beveled gears 65 and 66 respectively, and skew gear 67. In order to allow for longitudinal movement the beveled gear 65 is mounted upon the end of a shaft 68 which is connected with the universal coupling 64 by a splined sleeve 69. The table 5 is operated by the skew gear 63 through any convenient type of mechanism, preferably a lead screw.

The above mechanism provides a means whereby the table 5 may be fed in either direction, this means being controlled by the feeler 11.

In order that the cam blank shall be properly cut, it is necessary to provide an intermittent rotation of the cam blank which will operate in conjunction with the feeding means. This intermittent rotation is secured by providing a cam 70, shown in Fig. 3, which is mounted upon the cam shaft 18. The cam 70 is provided upon one face with a circular cam groove 71 which is eccentric to the axis of the cam. A cam roll 72 supported upon the end of the lever 73 is adapted to ride in the cam groove 71 and the movement of the roll is transmitted to the oscillatory segment 75 through its connection with the arm 74. In order to vary the throw or amount of oscillation of the segment 75, it is provided with a T-shaped groove 76 in which the end of the arm 74 is adjustably held by means of a thumb screw 77. The oscillation of the segment 75 communicates an intermittent rotation to the shaft 78 through a Horton clutch indicated in dotted lines in Fig. 3. This type of clutch is used in various kinds of machine tools where it is desired that a resultant movement in one direction only shall be obtained and need not be described in detail here. This intermittent rotation of the shaft 78 is transmitted to the cam blank and pattern cam through the worm 79 and worm gear 80 mounted upon the shaft 4.

The operation of the machine is as follows: A cam blank and a pattern of the required shape are first placed in proper position in the machine and the platen is then moved by hand to bring the two in contact with the milling cutter and feeler respectively. The power is then applied to the machine and as the cam shaft is rotated, the cam 29 will operate to disengage the locking means for the bell crank 15 and allow the feeler to move and follow the contour of the pattern. It will be assumed that at this point there is a depression in the pattern which it is desired to cut in the cam. As the locking means is disengaged the feeler 11 will move to the right (Fig. 1) into the depression, thus moving the lower end of the bell crank 15 and cam 32 to the left. Immediately after this movement takes place, the bell crank 15 is again locked holding the cam 32 in its new position. The cam 44 is so timed with relation to the cam 29 and cam 32 that the locking means for the arm 34 is disengaged just prior to the engagement of the roll 38 with the passage 39 and after the cam 32 has been moved to its new position. As the cam 32 is moved to the left from its normal position, the roll 38 will be forced to the left into line with the passage 39 and oscillate the arms 35 and 36, moving the roll 45 upwardly through the arms 47 and 48. The arm 34 is now locked and the parts held in their new position. This movement of the arm 36 has forced the roll 45 above the axis of the segment 46 and as the segment is constantly oscillating, the roll 45 will now be moved and oscillate the toothed segment 55 which in turn will communicate rotation through the gear 57, clutch 56 and following train of mechanism to the skew gear 63. The clutch 56 and the operating means therefor are so arranged that the shaft 58 will only be rotated at a certain period during the rotation of the gear 57. The disengaging means for the clutch 56 is timed so that the clutch will be inoperative during about one-half of each revolution. The rotation of the gear 63 moves the table 5 and the cam blank and pattern mounted thereon to the left and automatically returns the feeler 11 to its normal position. As the feeler 11 leads the milling cutter 3 a partial rotation of the cam blank by the cam 70 and intermediate mechanism brings it into proper position to be operated upon by the milling cutter. The feeler is then again unlocked and operates the controlling mechanism, the cam blank is partially rotated and the cutting operation repeated at a new point upon the periphery of the cam blank. The cam blank is thus intermittently rotated completely around until the entire circumference has been cut.

While it is preferred to employ the specific construction and arrangement of parts shown and described, it is to be understood that this construction and arrangement is not essential except so far as specified in the claims and may be changed or modified without departing from the broader features of the invention.

I therefore claim broadly and desire to secure by Letters Patent:—

1. A cam cutting machine, having, in combination, a cutting tool, a work support, a pattern cam, the cutting tool and work support being movable relatively to one another, a mechanism for controlling the movement of the work support, comprising a feeler arranged to engage the periphery of the relatively moving pattern cam, and an actuating mechanism the action of which depends upon the position of the feeler, substantially as described.

2. A cam cutting machine, having, in combination, a cutting tool, a work support, a pattern cam, the cutting tool and work support being movable relatively to one another, a mechanism for controlling the movement of the work support, comprising a feeler arranged to engage the periphery of the relatively moving pattern cam, an actuating mechanism, the action of which depends upon the position of the feeler and means for locking the feeler against movement during a portion of the time which the feeler engages the pattern cam, substantially as described.

3. A cam cutting machine, having, in combination, a cutting tool and a work support movable relative to one another, a relatively movable pattern cam, a feeler engaging the periphery of the pattern cam and adapted to control the movement of the work support and a separate actuating mechanism for operating the work support thrown into operation upon movement of the feeler, substantially as described.

4. A cam cutting machine, having, in combination, a cutting tool and a work support, movable relative to one another, a mechanism for controlling the movement of the work support, comprising a feeler arranged to engage the periphery of a relatively moving pattern cam, an actuating mechanism, and driving means for the actuating mechanism adapted to operate the actuating mechanism upon movement of the feeler, substantially as described.

5. A cam cutting machine, having, in combination, a cutting tool and a work support, movable relative to one another, a mechanism for controlling the movement of the work support, comprising a feeler arranged to engage the periphery of a relatively moving pattern cam, an actuating mechanism, a positively driven shaft, and means mounted upon the shaft for operating the actuating mechanism upon movement of the feeler, substantially as described.

6. A cam cutting machine, having, in combination, a cutting tool and a work support, movable relative to one another, a mechanism for controlling the movement of the work support, comprising a feeler arranged to engage the periphery of a relatively moving pattern cam, means for normally locking the feeler against movement, an actuating mechanism, a positively driven shaft, means mounted upon the shaft for disengaging the locking means at predetermined intervals, and means operated upon movement of the feeler to cause the actuating mechanism to be operated by the shaft, substantially as described.

7. A cam cutting machine, having, in combination, a cutting tool and a work support, movable relative to one another, a mechanism for controlling the movement of the work support, comprising a feeler arranged to engage the periphery of a relatively moving pattern cam, means for normally locking the feeler against movement, an actuating mechanism, a positively driven shaft, means mounted upon the shaft for disengaging the locking means at predetermined intervals, and means mounted upon the shaft and operating upon movement of the feeler to cause the actuating mechanism to be operated from the shaft, substantially as described.

8. A cam cutting machine, having, in combination, a cutting tool and a work support, movable relative to one another, a mechanism for controlling the movement of the work support, comprising an oscillatory feeler arranged to engage the periphery of a relatively moving pattern cam, a bell crank connected to the feeler, means for normally locking the bell crank in any adjusted position, a positively driven shaft, a cam mounted on said shaft, means operated by said cam for disengaging the locking means for the bell crank at predetermined intervals, a second cam slidably mounted upon the shaft and adapted to be moved by the bell crank lever, an actuating mechanism, means connecting the second cam and actuating mechanism and adapted upon movement of the second cam to cause the actuating mechanism to be operated from the shaft, substantially as described.

9. A cam cutting machine, having, in combination, a cutting tool and a work support, movable relative to one another, a mechanism for controlling the movement of the work support, comprising an oscillatory feeler arranged to engage the periphery of a relatively moving pattern cam, locking means for the feeler, a positively driven shaft, a cam slidably mounted upon said shaft and adapted to be moved longitudinally of the same upon oscillation of the feeler, a second cam mounted upon said shaft, a segment, adapted to be oscillated upon rotation of the second cam, an actuating mechanism normally connected to the segment at the axis about which the same oscillates, means connecting the slidably mounted cam and the actuating mechanism and adapted upon movement of the cam to move the connection of the actuating mechanism away from the axis of the segment whereby the actuating mechanism is operated, substantially as described.

10. A cam cutting machine, having, in combination, a cutting tool and a work support, movable relative to one another, a mechanism for controlling the movement of the work support, comprising an oscillatory feeler arranged to engage the periphery of a relatively moving pattern cam, a positively driven shaft, a cam slidably mounted upon the shaft and adapted to be moved upon oscillation of the feeler, locking means adapted to lock the feeler and cam against movement at certain predetermined intervals, a groove cam mounted upon the shaft, a segment having a portion engaging with the groove cam and adapted to be oscillated thereby, actuating mechanism normally connected with the segment at the axis about which the same oscillates and means connecting the slidable cam and the actuating mechanism adapted to move the connection between the actuating mechanism and segment away from the axis of the segment, substantially as described.

11. A cam cutting machine, having, in combination, a cutting tool and a work support, movable relative to one another, a mechanism for controlling the movement of the work support, comprising an oscillatory feeler arranged to engage the periphery of a relatively moving pattern cam, locking means adapted to prevent oscillation of the feeler at certain predetermined intervals, a positively driven shaft, a cam slidably mounted upon said shaft and adapted to be moved longitudinally of the same upon oscillation of the feeler, a second cam mounted upon said shaft, a segment adapted to be oscillated upon rotation of the second cam, an actuating mechanism normally connected to the segment at an axis about which the same oscillates, means connecting the slidably mounted cam and the actuating mechanism and adapted upon movement of the cam to move the connection of the actuating mechanism away from the axis of the segment whereby the actuating mechanism is operated, substantially as described.

12. A cam cutting machine, having, in combination, a cutting tool and a work support, movable relative to one another, a mechanism for controlling the movement of the work support, comprising an oscillatory feeler arranged to engage the periphery of a relatively moving pattern cam, a positively driven shaft, a cam slidably mounted upon said shaft and adapted to be moved upon oscillation of the feeler, locking means adapted to lock the feeler and cam against movement at certain predetermined intervals, a groove cam mounted upon the shaft, a segment having a portion engaging with the groove cam and adapted to be oscillated thereby, actuating mechanism normally connected with the segment at the axis about which the same oscillates and means connecting the slidable cam and the actuating mechanism adapted to move the connection between the actuating mechanism and segment away from the axis of the segment, and mechanism for locking the said connecting means in the position to which it has been moved by movement of the sliding cam, substantially as described.

13. A cam cutting machine, having, in combination, a cutting tool and a work support, movable relative to one another, a mechanism for controlling the movement of the work support, comprising a feeler arranged to engage the periphery of a relatively moving pattern cam, driving means, an actuating mechanism adapted to be operated by said driving means upon movement of the feeler, and means operated by said driving means for intermittently rotating the cam blank and pattern cam substantially as described.

14. A cam cutting machine, having, in combination, a cutting tool and a work support, movable relative to one another, a mechanism for controlling the movement of the work support, comprising a feeler arranged to engage the periphery of a relatively moving pattern cam, a positively driven shaft, an actuating mechanism, means mounted upon the shaft and adapted to operate the actuating mechanism upon movement of the feeler, means for communicating an intermittent rotation to the cam blank and pattern cam comprising an eccentric cam mounted upon the cam shaft, a segment oscillated thereby, a shaft upon which said segment is mounted, the connection between the segment and shaft adapted to communicate movement of the segment in one direction only whereby an intermittent rotation is communicated to the shaft, substantially as described.

15. A cam cutting machine, having, in combination, a cutting tool and a work support, movable relative to one another, a mechanism for controlling the movement of the work support, comprising a feeler arranged to engage the periphery of a relatively moving pattern cam, a positively driven shaft, a cam slidably mounted upon the shaft and adapted to be moved by the feeler, the cam having a peripheral groove narrowing at one point upon the periphery to a restricted passageway, an actuating mechanism, means mounted upon the shaft and adapted to operate said actuating mechanism, and means connecting the slidable cam and actuating mechanism, the means upon the shaft adapted to operate the actuating mechanism upon engagement of the connecting means with the restricted passage upon the periphery of the slidable cam, substantially as described.

16. A cam cutting machine, having, in combination, a cutting tool and a work support, movable relative to one another, a mechanism for controlling the movement of the work support, comprising a feeler arranged to engage the periphery of a relatively moving pattern cam, locking means adapted to normally lock the feeler against movement, driving means, an actuating mechanism, means operated by said driving means and adapted to temporarily disengage the locking means for the feeler to allow movement of the feeler to contact with the periphery of the cam blank, means connecting the feeler and actuating mechanism, locking means for holding the connecting means in any adjusted position and means operated by the driving means for temporarily disengaging the said locking means to allow movement of the connecting means whereby the actuating mechanism operated by the driving means, substantially as described.

17. A cam cutting machine, having, in combination, a cutting tool and a work support, movable relative to one another, a mechanism for controlling the movement of the work support, comprising a feeler arranged to engage the periphery of a relatively moving pattern cam, driving means and an actuating mechanism adapted to be operated by the driving means upon movement of the feeler, the actuating mechanism comprising a time clutch operated by the driving means whereby the actuating mechanism transmits movement to the work support, during a portion only of the time in which it is operating, substantially as described.

18. A cam cutting machine, having, in combination, a cutting tool and a work support relatively movable, a pattern cam, a power operated actuating mechanism for causing a relative feeding movement of the work support and cutting tool, and a control mechanism operated by the pattern cam and governing the operation of the actuating mechanism.

19. A cam cutting machine, having, in combination, a cutting tool and a work support movable with relation to one another, a pattern cam mounted upon the work support, means for intermittently rotating the pattern cam, and power actuated mechanism controlled by the pattern cam for imparting a relative feeding movement to the cutting tool and work support.

ERASTUS E. WINKLEY.

Witnesses:
 RUTH A. SIMONDS,
 WARREN G. OGDEN.